Figure 1:
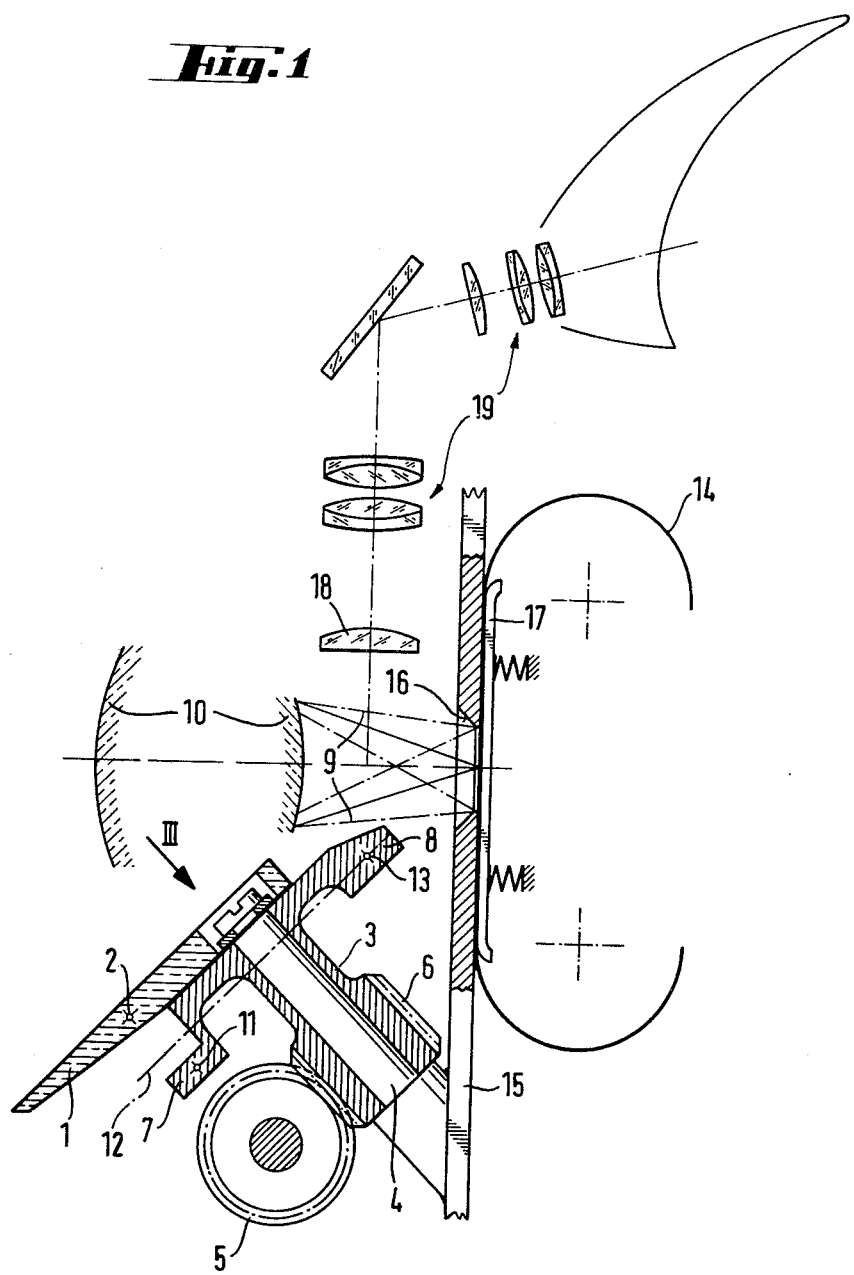

United States Patent [19]

Kästner

[11] 4,330,183
[45] May 18, 1982

[54] REFLEX DEVICE WITH A MIRROR SUBSTRATE OF VITREOUS CARBON

[75] Inventor: Erich Kästner, Munich, Fed. Rep. of Germany

[73] Assignee: Arnold & Richter Cine Technik GmbH & Co. Betriebs KG, Munich, Fed. Rep. of Germany

[21] Appl. No.: 190,860

[22] PCT Filed: Jul. 6, 1979

[86] PCT No.: PCT/DE79/00070

§ 371 Date: Mar. 7, 1980

§ 102(e) Date: Mar. 6, 1980

[87] PCT Pub. No.: WO80/00194

PCT Pub. Date: Feb. 7, 1980

[30] Foreign Application Priority Data

Jul. 7, 1978 [DE] Fed. Rep. of Germany ....... 2829999

[51] Int. Cl.³ ............................ G02B 5/08; G03B 9/10
[52] U.S. Cl. ..................................... 352/206; 350/288; 264/1.2; 428/408
[58] Field of Search .................. 350/288, 310, 320; 352/206; 423/445, 449; 264/1.2, 101, 102; 427/162

[56] References Cited

U.S. PATENT DOCUMENTS 3,833,347 9/1974 Angle et al. .......................... 65/32
3,900,328 9/1975 Parsons et al. ....................... 65/68

FOREIGN PATENT DOCUMENTS 1055474 4/1959 Fed. Rep. of Germany .
2430486 1/1976 Fed. Rep. of Germany .
644379 10/1950 United Kingdom .

OTHER PUBLICATIONS

Cowland, F. C., "A New Form of Carbon", Compon. Technol., vol. 4, No. 6, pp. 3-7, Feb. 1971.

*Primary Examiner*—Jon W. Henry
*Attorney, Agent, or Firm*—Fleit & Jacobson

[57] ABSTRACT

Reflex devices, preferably on cinematographic and photographic cameras with rotating, oscillating or displaceable retracting mirrors are easier to balance the lighter the dynamically operated reflecting mirror is in weight. The weight reduction is achieved by using pure carbon, preferably in the form of glass-like carbon, for the mirror carrier material. The pores in the micro range exposed at the polished surface during the precision treatment are eliminated by an additional vacuum treatment in the production of the three-dimensionally cross-linked plastics intermediate product.

2 Claims, 3 Drawing Figures

REFLEX DEVICE WITH A MIRROR SUBSTRATE OF VITREOUS CARBON

The invention relates to reflex devices, preferably on cinematographic and photographic cameras with rotating, oscillating or displaceable retracting mirrors.

The mirrors of such devices or similar devices are optical precision mirrors which are usually made of glass or also of metal. For well known dynamic reasons, such moved mirrors should have as little weight as possible, irrespective of whether they are rotating, oscillating or pivoted mirrors. One can endeavour to obtain a low weight for such mirrors by making them thin but, by reason of the required surface quality for all precision mirrors, this has a limit in the minimum ratio between the mirror thickness and size. In precision equipment such as reflex cameras, constructional reasons often make it necessary not only to balance the rotary mirror shutters statically but, because of the high rotary speeds between 1500 and 6,000 r.p.m., also to balance them dynamically. In the case of one-piece unsymmetrical mirrors this usually involves an additional mass to place the necessary counterweight in such a way that it will not obstruct the optical passage of the beams at the rotating mirror system. Since the balancing masses for dynamic balancing are relatively large by reason of the mirror weights that can nowadays be achieved, the space available for accommodating them between the rotary mirror shutter and the plane of the film is often inadequate, even if the balancing masses are made from tungsten. The larger the balancing masses have to be, the more detrimental their higher inertia will be for the camera drives which are nowadays usually precision controlled. An undesirably high inertia necessitated by an excessively large mirror weight also has a very unfavourable dynamic effect on oscillating or pivoted mirrors.

The invention is based on the problem of improving the reflex device of the aforementioned kind so that a weight reduction of the dynamically operated reflex mirrors is obtained for the same optical surface quality, whereby dynamic balancing is made possible in restricted space conditions particularly for one-piece unsymmetric rotating mirrors and the inertia is considerably reduced in the case of rotating, oscillating and pivoted mirrors.

The solution of this problem by means of the invention resides in that the invention uses for such reflex devices of the kind here in question pure carbon, preferably in the form of glass-like carbon (also known as vitreous carbon), for the mirror carrier material. A reflex device having the mirror made from this carrier material offers a number of considerable advantages which will hereinafter be described. In what follows, the mirror carrier material as distinct from the mirror coating will, for the sake of clarity, be referred to simply as a substrate.

1. The specific weight of the glass-like carbon is about 40% less than the light weight types of glass that are nowadays available and, because of the aforementioned dynamic reasons, this is of decisive importance for balancing purposes and the inertia behaviour of movable mirrors.

2. The mirror substrate of pure carbon, preferably so called glass-like carbon, is much more temperature-resistant than glass and, by reason of its coefficient of expansion at about $3.10^{-6}$ per degree which is on average only half that of glass, it is even less liable to distort than glass. This property of a high temperature resistance is particularly valuable in the case of vacuum vaporisation of complicated dichroic multi-layer coatings such as metal oxide vaporised mirrors because here the mirror substrate is subjected to temperatures up to above 600° K. which destroys the high surface quality of many optical types of glass. In the practical use of professional cameras having reflex devices, considerable temperature fluctuations can occur up to about 130° K.; e.g. in the baggage compartment of an interContinental aircraft or in polar expeditions temperatures of about 220° K. are no rarity; in contrast to this very low temperature, temperatures up to about 350° K. exist in the luggage compartment of an automobile parked in the sun or during technical photographing in a laboratory or, for example, in the vicinity of a blast furnace.

3. The mirror substrate used in accordance with the invention in the form of glass-like carbon has a high hardness (Mohs' hardness above 7) and an absolute corrosion resistance and is therefore optically most suitable for polishing whilst its polish can be maintained without taking additional protective measures. In contrast, glass precision mirrors have to be remetallised by vapour deposition soon after being polished because storage in the polished condition very easily leads to oxidation stains, as does the use of unsuitable packaging material.

4. Since this mirror substrate is inert to all environmental nfluences, it is easy to clean as a pretreatment for vacuum vaporisation and can even be cleaned with very aggressive media, which is an essential requirement for complicated dichroic multi-layer mirror coatings, e.g. for metal oxide vaporised mirrors which may have more than 30 layers. Although aggressive cleansing agents have an extremely effective cleaning effect, they can easily lead to undesirable oxidation spots in the case of conventional glass which is sometimes very sensitive, this being quite impossible because of the high resistance of a mirror substrate made from glass-like carbon. Even hydrofluoric acid could be used for intensive cleaning without leaving damaging influences and this can be particularly important if incorrect vaporisation has to be removed without destroying the mirror substrate.

5. The mirror substrate according to the invention can be vaporised in a high vacuum after being cleaned as described at item 4 above without any damaging side effects and with a particularly good bond. Nor will the substrate produce any detrimental vapour pressure during evacuation.

6. For particular applications in which it is important that, in contrast with reflected light, no spectral components (e.g. infrared) are permitted to pass through the mirror, the mirror substrate according to the invention is of particular advantage because the carbon absorbs these spectral components.

The so-called glass-like carbon from which the mirror substrate of a reflex device is made in accordance with the invention is produced by controlled coking of three-dimensionally cross-linked synthetic resins. The physical and technological properties of this material required in accordance with the invention can be achieved by suitable temperature treatment. This material is marketed under the name 'Glass-like carbon e.g. Type ES 10' and can be obtained from Messrs. Ringsdorff.

This material was developed for the chemical laboratory, metallurgy and semi-conductor production. In the chemical laboratory, there are crucibles, boats, dishes for evaporation, boiling down, melting and disintegration as well as wheel electrodes for the spectral analysis of fluids made from this so-called glass-like carbon. In metallurgy, melting crucibles and evaporation boats for vacuum vaporisation are made from this material. Finally, crucibles and plates for epitaxy are made from this material in semi-conductor production.

Since too many pores in the micro range for optical purposes were exposed at the polished surface during the precision treatment of conventional glass-like carbon materials, the manufacturer still had to take measures for eliminating these pores for the use described in the application, this having been made possible by the additional vacuum treatment during production of the three-dimensionally cross-linked synthetic resin intermediate product.

Since the advantages of the reduced mirror inertia by using glass-like carbon as the mirror substrate cannot be reproduced in a drawing, the following description of the invention with reference to the drawing is limited to only one example of a rotary one-piece unsymmetric dynamically balanced rotary mirror shutter for a cinematographic camera in confined space conditions by using glass-like carbon as the mirror substrate.

In FIG. 1, the rotary mirror shutter of a cine camera is shown so that the mirror leaves the frame on the film unobstructed for exposure.

Figure 2:
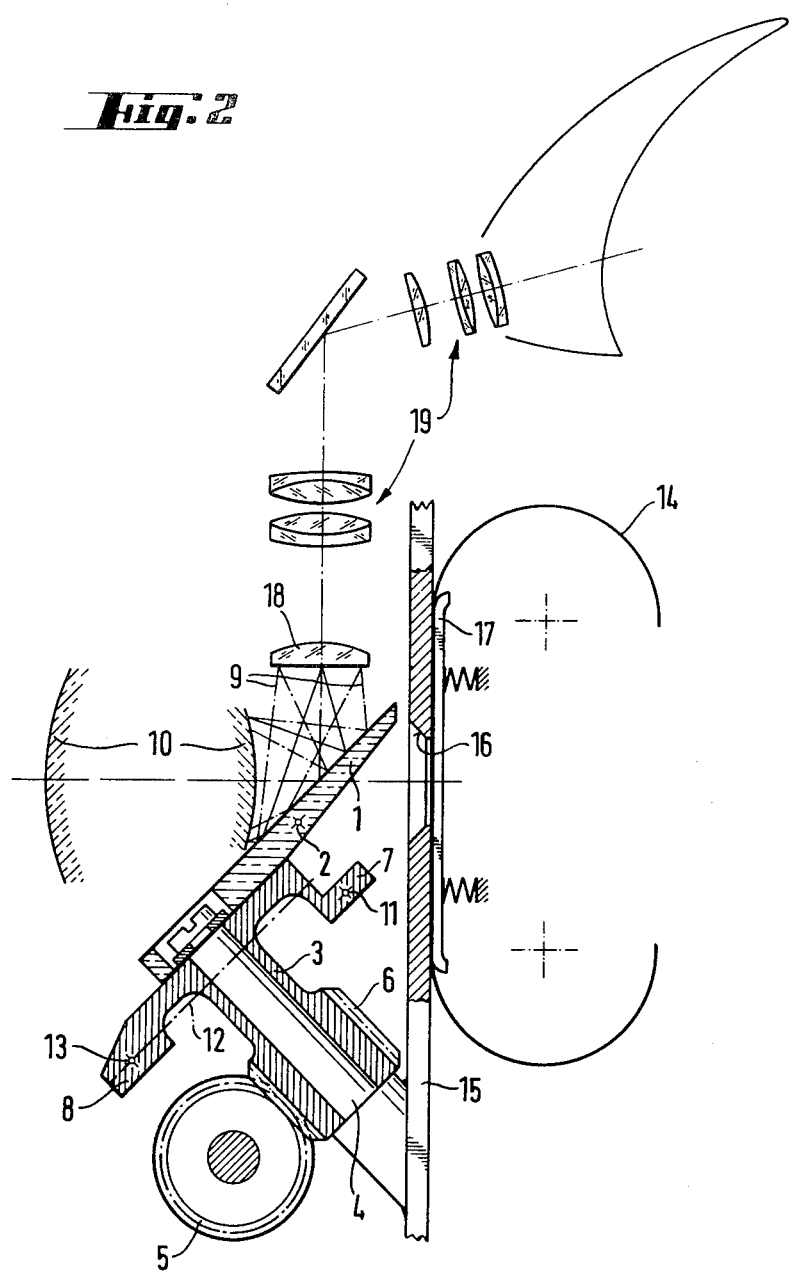

In the representation of FIG. 2, the mirror of the rotary shutter obscures the frame on the film during transporting of the film so that the light beam for taking a picture is during this period deflected at the reflecting surface of the mirror onto the mattdisc of the viewfinder.

Figure 3:
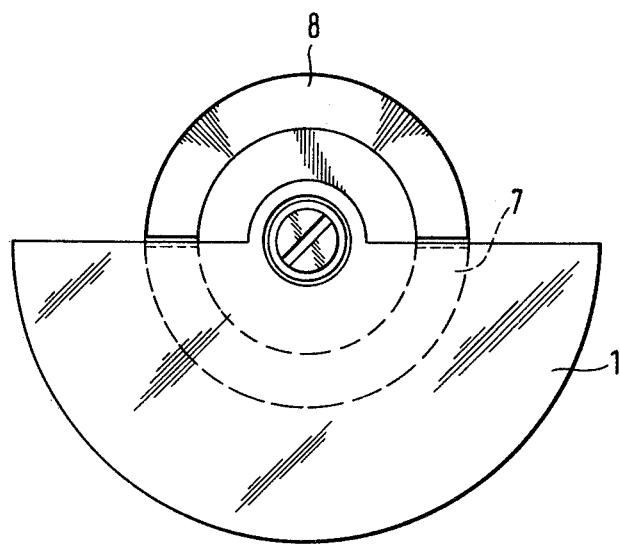

FIG. 3 is a plan view of the reflecting surface of the asymmetric one-piece rotary mirror shutter.

FIGS. 1 and 2 show the basic arrangement of the rotary mirror shutter, 1 being the mirror of glass-like carbon and 2 its centre of gravity. The mirror 1 is secured, e.g. adhered, to the rotating carrier member 3. The carrier member 3 of the mirror is for example mounted on a stud 4 and driven by the pair of gears 5 and 6. This mirror carrier member 3 also fulfills the function of an auxiliary mass 7 and a compensating mass 8 each having a substantially semicircular construction of the same diameter at the carrier member. As will also be evident from FIG. 1, it would never be possible to obtain dynamic balancing of the mirror 1 by arranging the centre of gravity of a compensating mass precisely opposite to the centre of gravity 2 of the mirror because otherwise the compensating mass would intersect the exposure beam 9 of the taking lens 10. For this reason an auxiliary mass 7 is required which, with its centre of gravity 11 disposed behind the mirror 1 and the centre of gravity 2 of the mirror forms a common resultant centre of gravity in a balancing plane 12 behind the mirror 1 so that the centre of gravity 13 of the compensating mass can be disposed in this balancing plane 12 without thereby detrimentally influencing the exposure beam 9, as will be evident from FIG. 1. With the described arrangement of the rotary mirror shutter, the film 14 runs between the film guide 15 which is located on the side of the objective and contains a window frame 16 and the pressure rail 17. The intermittently exposed matt disc 18 of the viewfinder is viewed through a coventional viewfinder lens arrangement 19. The positions of FIGS. 1 and 2 are fully identical but, in contrast with FIG. 1, the rotary mirror shutter of FIG. 2 is in a closed position relatively to the film.

FIG. 3 shows an example of the shape of a one-piece asymmetrical rotary mirror shutter, wherein one represents the actual mirror and the broken radius represents the auxiliary mass 7 disposed behind the mirror. The counterweight as a balancing mass is characterised by the semi-circle 8.

This detailed explanation of the pictorial example shows how difficult it is to achieve proper dynamic balancing if, firstly, the available space conditions are confined and, secondly, it is necessary to keep the inertia of the rotary mirror shutter within small limits.

It was only through a low total weight of the rotary mirror shutter, which is almost exclusively obtained by the low specific weight of the mirror made from glass-like carbon, that it was possible to fulfill both requirements.

I claim:

1. A mirror reflex installation for use in a camera, the mirror reflex installation being mountable in the camera for movement, such as rotating, oscillating, and folding, and comprising:
   a mirror substate formed of vitreous carbon and having one surface processed to have a glass-like finish; and
   a mirror coating applied to said one surface of said mirror substrate.

2. In a photographic camera having a first lens system defining an exposure beam, a second lens system defining a viewing beam, a mirror assembly, and means for moving said mirror assembly between a first position in which the assembly blocks the exposure beam and reflects the viewing beam and a second position in which the assembly is spaced from the exposure beam, the improvement wherein the mirror assembly comprises:
   a mirror substate formed of vitreous carbon and having one surface processed to have a glass-like finish; and
   a mirror coating applied to said one surface of said mirror substrate.

* * * * *